Nov. 28, 1967         V. D. DAILEY         3,354,794

PISTON STRUCTURE

Filed May 17, 1965

INVENTOR.
VACELL D. DAILEY

BY *Whittemore*
*Hulbert & Belknap*

ATTORNEYS

United States Patent Office 3,354,794
Patented Nov. 28, 1967

3,354,794
PISTON STRUCTURE
Vacell D. Dailey, 6629 Winiate Drive,
Waterford, Mich. 48095
Filed May 17, 1965, Ser. No. 456,297
4 Claims. (Cl. 92—243)

ABSTRACT OF THE DISCLOSURE

Piston structure including separate sealing and bumper members wherein the sealing member comprises an annular metal disc and a seal at the outer periphery thereof with inwardly opening annular recesses therein for receiving the disc and a bumper member on each side of the disc which bumper members include further annular discs having resilient bumpers secured to one side thereof each with a radially outwardly extending annular flange adapted to be received in one of the annular inwardly directed recesses in the seal. The seal of the sealing member has a Shore Durometer hardness of between 75 and 85 on the A Scale and extends over substantially the entire side surfaces of the disc of the sealing member and the bumper has a Shore Durometer hardness of between 50 and 80 on the A Scale.

---

The invention relates to piston and cylinder structure and refers more specifically to a piston including a center sealing member and end bumper members having means integral therewith for assembly thereof.

In the past pistons for piston and cylinder structures have sometimes been produced with a unitary piston sealing and bumper member. With such structure all portions of the sealing and bumper member are usually constructed of the same material. Because of different wear and resilient properties of different materials, such as synthetic rubbers, unitary piston structures constructed of a single material do not have both optimum sealing and bumper properties.

Where different materials have been used in piston structure for seals and bumpers, due to manufacturing considerations, the seals and bumpers have generally been produced as a part of separate sealing and bumper members. Prior separate sealing and bumper members have required separate assembly means therefor and often have not been constructed to minimize leakage between the sealing and bumper members and through the sepparate members.

It is therefore one of the objects of the present invention to provide improved piston structure.

Another object is to provide piston structure including a separate sealing member and bumper members constructed to permit a minimum of leakage therethrough.

Another object is to provide piston structure as set forth above wherein the sealing member and bumper members include a separate seal and bumpers constructed of material having different hardness.

Another object is to provide piston structure as set forth above wherein the sealing member and bumper members include means integral therewith for assembly thereof.

Another object is to provide a sealing member for piston structure comprising a flat annular rigid disc and a resilient seal bonded thereto over substantially the entire surface thereof and having an annular sealing flange extending in the direction of the axis of generation of the annular disc in both directions from the outer periphery thereof which flange has an annular inwardly opening internal recess adjacent each side of the annular disc.

Another object is to provide a bumper member for piston structure comprising a substantially flat annular rigid disc and a resilient bumper bonded thereto over substantially one entire side surface thereof including a portion extending outwardly of the one side of the disc adjacent the outer periphery thereof and a radially outwardly extending annular flange positioned at the outer periphery of the disc.

Another object is to provide piston structure which is simple in construction, economical to manufacture and efficient in use.

Other objects and features of the invention will become apparent as the description proceeds, especially when taken in conjunction with the accompanying drawings, illustrating a preferred embodiment of the invention, wherein.

Figure 1:
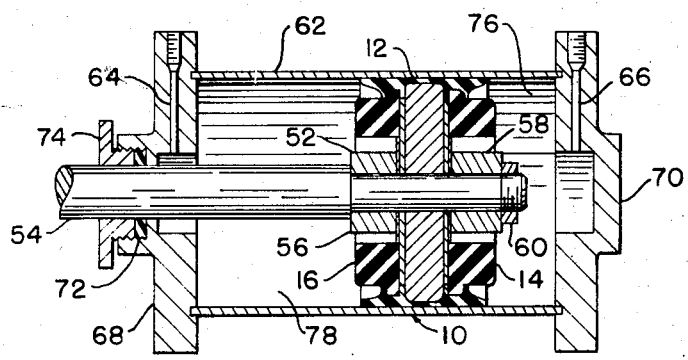
FIGURE 1 is a longitudinal section view of piston and cylinder structure including a piston constructed in accordance with the invention.
Figure 2:
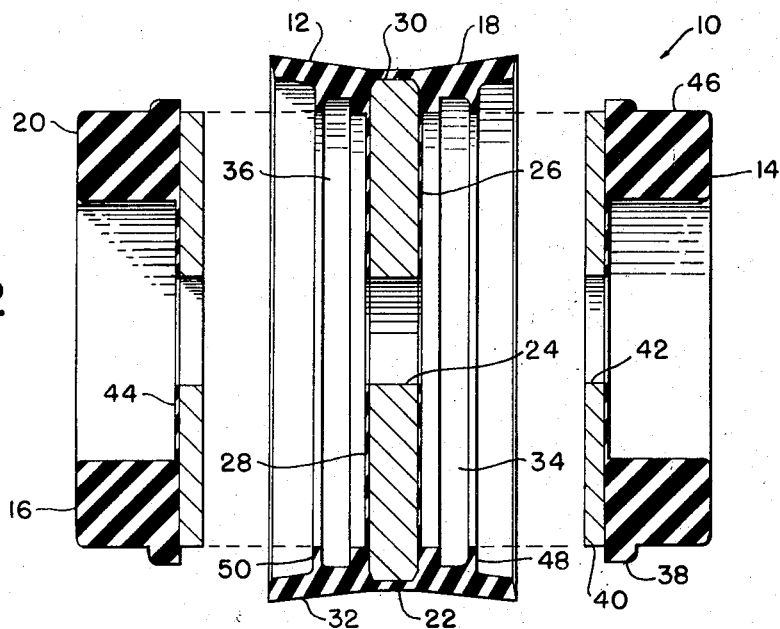
FIGURE 2 is an exploded longitudinal section view of the piston structure illustrated in FIGURE 1.

With particular reference to the figures of the drawing, one embodiment of the present invention will now be considered in detail.

The piston structure 10 includes a center sealing member 12 and a pair of end bumper members 14 and 16 respectively. The seal 18 of the sealing member 12 and the bumpers 20 of the identical bumper members 14 and 16 are constructed of synthetic rubbers having different hardness. In addition the sealing member 12 and the bumper members 14 and 16 include means integral therewith for assembly thereof.

More specifically, the sealing member 12 of the piston structure 10 includes a flat annular metal disc 22 having the opening 24 extending therethrough concentric with the axis of generation thereof and the seal 18 bonded thereto over both side surfaces 26 and 28 and the outer periphery 30 thereof. The seal 18 includes the sealing flange 32 positioned at the outer periphery 30 of the annular disc 24 and extending outwardly of both sides 26 and 28 of the disc 22 in the direction of the axis of generation of the disc. The outer peripheral surface of the seal 18 is provided with a concave configuration, while the inner surface of the flange 32 is provided with annular, radially inwardly opening recesses 34 and 36 adjacent the sides 26 and 28 of the annular disc 22 for receiving the flange 38 of the identical bumper members 14 and 16.

The bumper members 14 and 16 each include a flat annular metal disc 40 having the opening 42 extending therethrough. The bumper 20 is bonded to disc 40 over substantially the entire side 44 thereof. The bumper 20 includes the annular radially outwardly extending flange 38 which extends beyond the outer periphery of the disc 40 and is adapted to fit within the respective recess 34 or 36 of the sealing member 12. The bumper 20 further includes an annular bumper portion 46 extending axially outwardly of the side 44 of the disc 40 in the direction of the axis of generation of the disc 40.

The thickness of the disc 40 is slightly greater than the dimension of the seal 18 in the direction of the axis of generation of the disc 26 between the axially outer surface of the portion of the seal 18 bonded to the radially inward portion of the disc 22 and the axially inner surface of the respective recess 34 or 36, while the flange 38 is intended to be a tight fit within the recesses 34 and 36. Thus, with the sealing and bumper members assembled there will be some tendency for the bumper members to be urged outwardly of the sealing member and a tight seal therebetween is effected.

The seal 18 is constructed of synthetic urethane rubber having a Shore Durometer A Scale hardness of between 75 and 85. In contrast, the bumper of the bumper members 14 and 16 are constructed of a synthetic butyl rubber having a Shore Durometer A Scale hardness of between 50 and 80. Thus, optimum sealing and wear properties are provided with the piston structure 10 along with maximum bumper efficiency.

In use, as shown best in FIGURE 1, the bumper members 14 and 16 are assembled with the sealing member 12 by forcing the flanges 38 into the recesses 34 and 36 over the relatively narrow radially inwardly extending flanges 48 and 50 of the seal 18 formed by the recesses 34 and 36. The piston 10 is then placed over the reduced diameter end 52 of piston rod 54 after the spacer sleeve 56 has been positioned thereon. The piston 10 is followed by a second spacing sleeve 58. The spacing sleeves 56 and 58 with the piston structure 10 therebetween are then secured to the end 52 of the piston rod 54 by means of the nut 60.

The rod 54 may then be reciprocated within the cylinder 62 by means of convenient fluid flow through the passages 64 and 66 in the cylinder end walls 68 and 70. Piston rod 54 is sealed by means of the packing 72 and sealing collar 74 as will be understood by those in the piston and cylinder art.

On reciprocal movement of the piston rod 54 and piston 10 secured thereto a seal will be maintained between the ends 76 and 78 of the cylinder 62 by means of the sealing member 12. Impact with the ends 68 and 70 of the cylinder 62 by the piston 10 will be cushioned by the bumper members 14 and 16.

Figure 3:
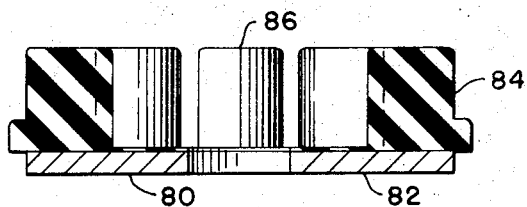
FIGURE 3 is a section view of a modified bumper member for use in piston structure, such as illustrated in FIGURE 2.

While one embodiment of the present invention has been considered in detail, it will be understood that other embodiments and modifications are contemplated by the inventor. For example, in FIGURE 3 a modified bumper member 80 is shown in which the annular disc 82 is the same as the annular disc 40 and in which the bumper 84 is provided with cylindrical bumper portions 86 spaced angularly about the disc 82 in place of the annular bumper portion 46 of the bumpers 14 and 16. It is the intention to include all embodiments and modifications of the invention as are defined by the appended claims within the scope of the invention.

What I claim as my invention is:
1. Piston structure comprising a sealing member including an annular disc, a seal secured to the outer periphery of the annular disc having an axially extending sealing flange thereon and including three axially spaced apart, radially inwardly opening annular recesses therein with the outer periphery of the disc positioned in the middle recess, a separate annular bumper member at each side of the sealing member, each including a radially outwardly extending peripheral flange received within one of the other annular recesses in the seal of the sealing member and an axially extending bumper portion extending axially outwardly of the seal.

2. Structure as set forth in claim 1 wherein the seal extends over the entire side surfaces of the disc of the sealing member and the radially outer surface of the seal is concave.

3. Structure as set forth in claim 1 wherein the bumper members each include an annular disc, the bumper is secured over the entire side surface of the annular disc and the annular disc is of a dimension axially of the piston structure substantially equal to the distance between the middle and one of the other recesses in the seal minus the thickness of the seal extending over the side surface of the annular disc of the sealing member.

4. Structure as set forth in claim 1 wherein the seal is of urethane rubber and a Shore Durometer hardness of between 75 and 85 on the A Scale and the bumper is butyl rubber having a hardness of between 50 and 80 on the Shore Durometer A Scale.

References Cited

UNITED STATES PATENTS

| | | | |
|---|---|---|---|
| 2,415,181 | 2/1947 | Johnson | 92—243 X |
| 2,426,108 | 8/1947 | Loewe | 92—244 X |
| 2,442,650 | 6/1948 | Hoffman | 92—250 X |
| 2,556,698 | 6/1951 | Loewe | 92—244 X |
| 2,574,273 | 10/1951 | McLeod | 92—243 X |
| 2,984,529 | 5/1961 | Dailey | 92—243 X |
| 2,994,571 | 8/1961 | Peras | 92—243 X |
| 3,136,228 | 6/1964 | Dailey | 92—249 X |
| 3,155,014 | 10/1964 | Genz | 92—244 X |
| 3,157,095 | 10/1964 | Heiser | 92—253 X |

MARTIN P. SCHWADRON, *Primary Examiner.*

G. N. BAUM, *Assistant Examiner.*